(12) United States Patent
Röhm

(10) Patent No.: US 6,341,783 B1
(45) Date of Patent: Jan. 29, 2002

(54) DRILL CHUCK

(75) Inventor: Günter Horst Röhm, Sontheim (DE)

(73) Assignee: Rohm GmbH, Sontheim (DE)

( * ) Notice: Subject to any disclaimer, the term of this patent is extended or adjusted under 35 U.S.C. 154(b) by 0 days.

(21) Appl. No.: 09/506,526

(22) Filed: Feb. 17, 2000

(30) Foreign Application Priority Data

Feb. 20, 1999 (DE) .......................................... 199 07 331

(51) Int. Cl.⁷ .............................................. B23B 31/12
(52) U.S. Cl. .......................... 279/62; 279/140; 279/902
(58) Field of Search ............................ 279/60–65, 140, 279/902

(56) References Cited

U.S. PATENT DOCUMENTS

| | | | | |
|---|---|---|---|---|
| 5,458,345 A | * | 10/1995 | Amyot | 279/62 |
| 5,765,839 A | | 6/1998 | Rohm | 279/62 |
| 5,816,583 A | * | 10/1998 | Middleton | 279/62 |
| 5,829,761 A | | 11/1998 | Rohm | 279/62 |
| 6,102,411 A | * | 8/2000 | Wilson | 279/62 |

* cited by examiner

Primary Examiner—Steven C. Bishop
(74) Attorney, Agent, or Firm—Herbert Dubno Andrew Wilford

(57) ABSTRACT

A drill chuck has a body having a front part and a rear part, and formed with a plurality of angled guides opening axially forward at the front part. Respective jaws axially and radially displaceable in the guides are each formed with a row of teeth engaging an internal thread of a one-piece and unsplit tightening ring axially fixed but rotatable about the axis on the chuck-body front part and having an inner diameter greater than an outer diameter of the chuck-body front part. Thus rotation of the tightening ring displaces the jaws in their guides. A one-piece and unsplit snap ring set in the chuck-body rear part bears axially forward on the tightening ring, is formed with an array of outwardly projecting teeth, and has an inner diameter greater than the outer diameter of the chuck-body front part. An adjustment sleeve rotatable about the axis on the body has a front end with a surface bearing directly on the chuck-body front part. A coupling sleeve fixed to the tightening ring and engaging the adjustment sleeve has formations permitting limited relative angular movement of the adjustment sleeve relative to the tightening ring between a pair of end positions. A retaining member secures the adjustment sleeve on the chuck-body front end, and a locking element rotationally fixed to the adjustment sleeve is engaged between the teeth in one end position of the adjustment sleeve and disengaged from the teeth in the other end position of the adjustment sleeve.

15 Claims, 5 Drawing Sheets

DRILL CHUCK

FIELD OF THE INVENTION

The present invention relates to drill chuck. More particularly this invention concerns a lockable chuck that can be tightened and loosened by hand.

BACKGROUND OF THE INVENTION

A drill chuck as shown in commonly owned U.S. Pat. No. 5,82,761 has a body centered on and rotatable about an axis and formed with a plurality of angled guides opening axially forward at a front chuck end and holding respective radially displaceable jaws each formed with a row of teeth. A metallic inner ring axially fixed but rotatable about the axis on the body has a screwthread meshing with the teeth so that rotation of the inner ring displaces the jaws in their guides. An adjustment sleeve rotatable about the axis on the body has a hard outer part and an inner part of a softer material fixed on the outer part. A metallic intermediate ring fixed on the inner ring has formations coupled to the hard outer part. The inner part rides on the intermediate ring. The sleeve is provided with means for rotationally arresting the inner and intermediate rings on the body. In particular the plastic inner part is formed with a cam for actuating the arresting means.

Such a chuck has proven quite popular as it is easy to tighten and loosen by hand. It is, however, fairly complex.

OBJECTS OF THE INVENTION

It is therefore an object of the present invention to provide an improved lockable drill chuck.

Another object is the provision of such an improved lockable drill chuck which overcomes the above-given disadvantages, that is which has all the features of the above-described chuck but is of simpler construction.

SUMMARY OF THE INVENTION

A drill chuck has according to the invention a body centered on and rotatable about an axis, having a front part and a rear part, and formed with a plurality of angled guides opening axially forward at the front part. Respective jaws axially and radially displaceable in the guides are each formed with a row of teeth engaging an internal thread of a one-piece and unsplit tightening ring axially fixed but rotatable about the axis on the chuck-body front part and having an inner diameter greater than an outer diameter of the chuck-body front part. Thus rotation of the tightening ring displaces the jaws in their guides. A one-piece and unsplit snap ring set in the chuck-body rear part bears axially forward on the tightening ring, is formed with an array of outwardly projecting teeth, and has an inner diameter greater than the outer diameter of the chuck-body front part. An adjusts ment sleeve rotatable about the axis on the body has a front end with a surface bearing directly on the chuck-body front part. A coupling sleeve fixed to the tightening ring and engaging the adjustment sleeve has formations permitting limited relative angular movement of the adjustment sleeve relative to the tightening ring between a pair of end positions. A retaining member secures the adjustment sleeve on the chuck-body front end, and a locking element rotationally fixed to the adjustment sleeve is engaged between the teeth in one end position of the adjustment sleeve and disengaged from the teeth in the other end position of the adjustment sleeve.

Such a chuck can be assembled simply by fitting the parts axially together and finally fixing the adjustment sleeve in place with the retaining member. Since both the tightening ring and snap ring are annularly continuous, they are very strong. Thus the adjustment sleeve can be made of plastic or a nonmetallic material with no significant loss of durability on the part of the chuck. Machining the chuck body is substantially cheaper since, with the exception of the jaw passages, all its surfaces are surfaces of revolution so it can be turned.

According to the invention each passage has a front end and a rear end and the adjustment sleeve has an inner surface centered on the axis and engaging the chuck-body front part back to the rear passage ends. This construction improves the support of the adjustment sleeve on the chuck body and is made possible because the locking teeth are moved back into the body of the chuck, making the front end available for guiding purposes.

Furthermore in accordance with the invention the retaining member is formed by a radially deflectable tab on the adjustment sleeve. The chuck-body front end is formed with a radially outwardly open groove into which the tab can fit. For most efficient connection the adjustment sleeve is formed with a plurality of such tabs. Thus the adjustment sleeve can simply be snapped in place so the chuck can be assembled wholly without tools.

For further guiding of the adjustment member on the chuck body a disk fixed on the chuck-body rear part rearward of the tightening ring has an outer periphery engaging and guiding the adjustment sleeve. Snap-interfit formations between the disk and the chuck-body rear part secure the disk on the chuck-body rear part. More specifically the chuck-body rear part is formed with a rearwardly directed shoulder and immediately thereadjacent a radially outwardly open groove. The snap-interfit formations include a radially inwardly projecting ridge on the disk. The disk sitting on the shoulder is formed adjacent the ridge with axially throughgoing holes permitting an inner periphery of the disk to deform outward for fitting of the ridge to the groove. Thus the adjustment sleeve is supported at the extreme front end of the chuck directly on the chuck body and at the extreme rear end of the chuck on the disk fixed on the chuck body.

The snap ring according to the invention is formed with radially inwardly projecting tabs received in the passages. These tabs rotationally couple it to the chuck body. They also project axially forward and guidingly engage the respective jaws, making them move more smoothly.

The retaining member can also be a snap ring set in the chuck-body front part. This snap ring is split and of metal, although it would be possible to make it of an elastomer like rubber. The chuck-body front part has an extreme front end formed with chamfered edge facilitating installation of the snap ring, making it easy to fit the snap ring in place and complete the assembly of the chuck. It is further possible to provide the adjustment sleeve with an axially forwardly directed end shield cap, in particular when the adjustment sleeve is of plastic. This end shield cap can have an inner periphery engaged between the snap ring and the adjustment sleeve.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
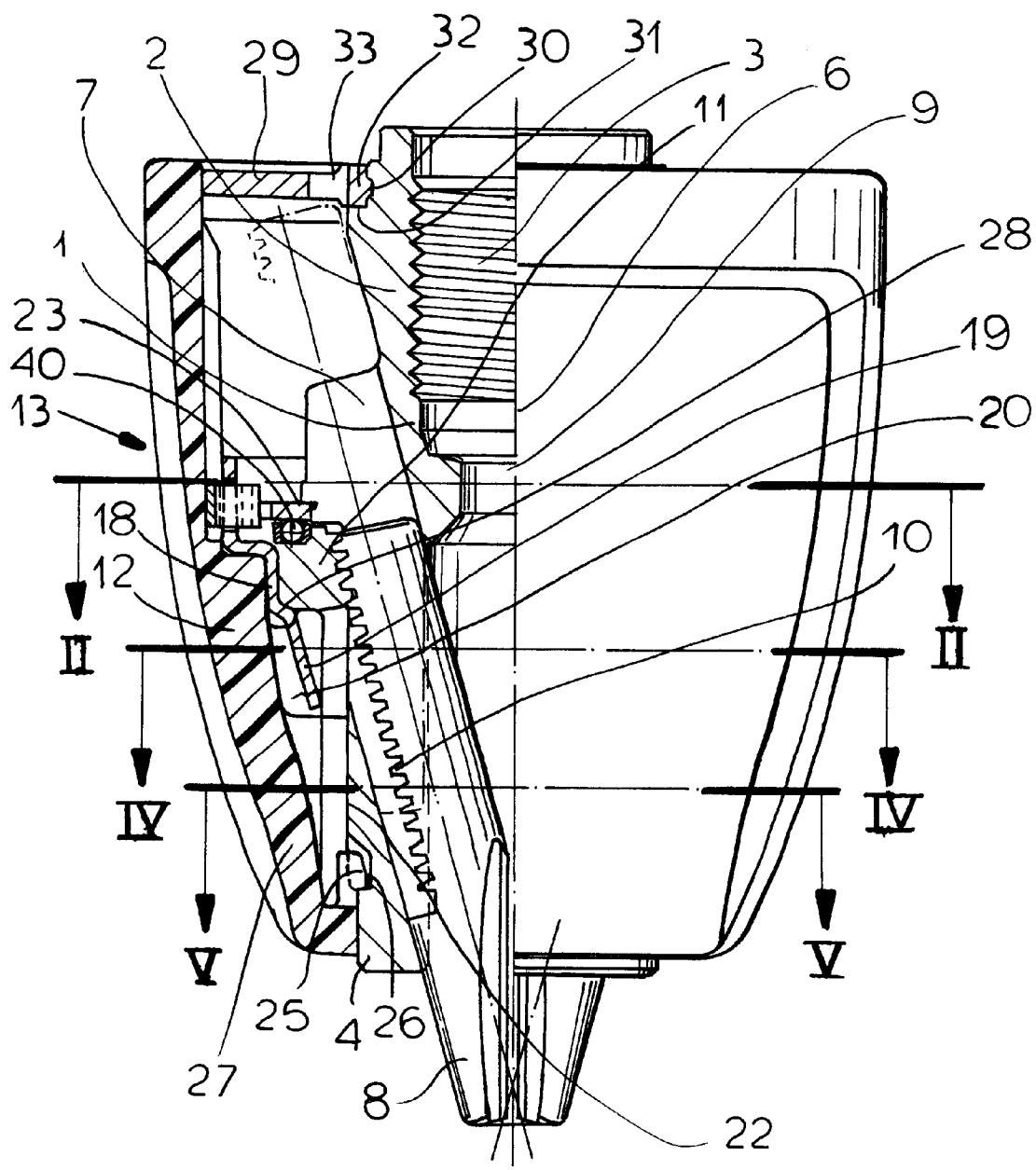
FIG. 1 is a partly sectional side view of the chuck according to the invention.
Figure 2:
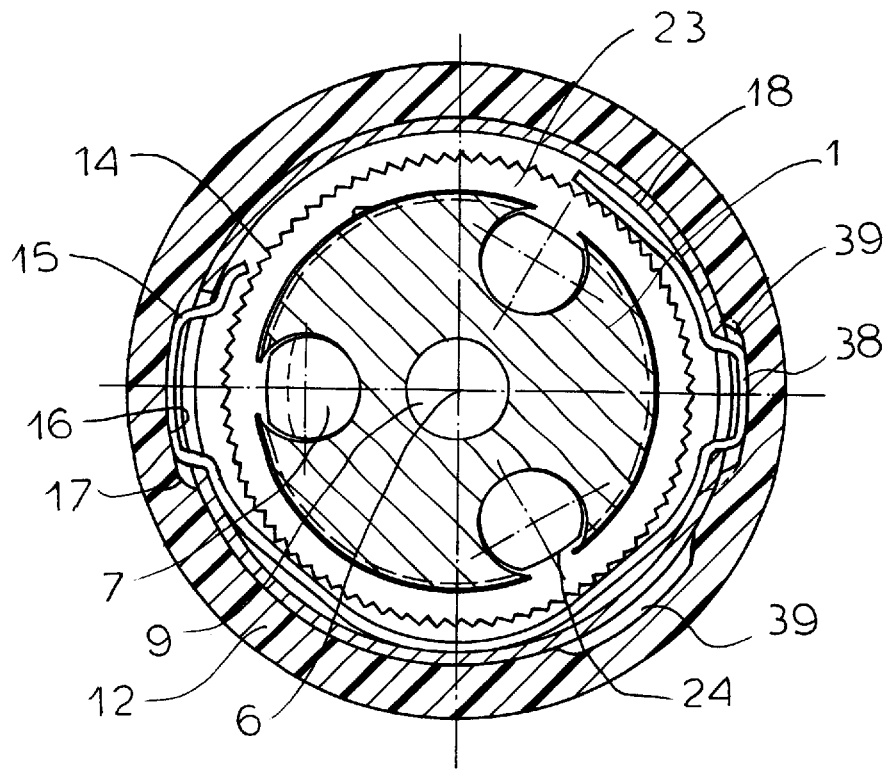
FIG. 2 is a cross section taken along line II—II of FIG. 1 with the chuck unlocked.
Figure 3:
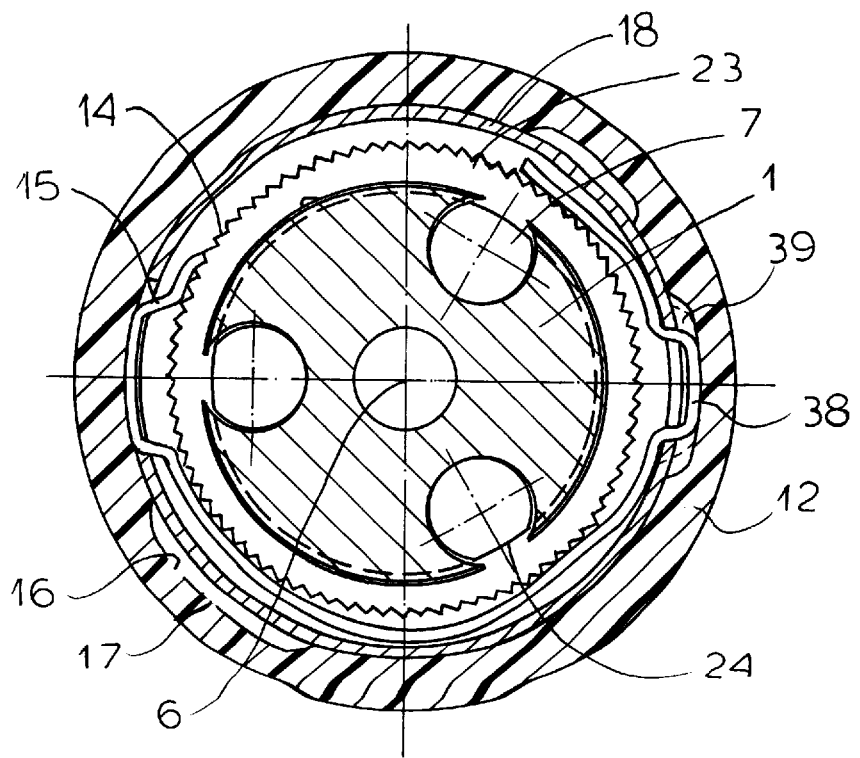
FIG. 3 is a view like FIG. 2 but with the chuck locked.

As seen in FIG. 1 through 5 a chuck has a body 1 with a rear part 2 formed with a threaded bore 3 for attachment to an unillustrated power-unit spindle. It also has an axially front part 4 forming a forwardly open tool-receiving hole 5 centered coaxially with the bore 3 on an axis 6. Three angled guide passages 7 angularly equispaced about the axis 6 hold respective jaws 8 which can be moved radially inward and axially forward to grip a tool in the hole 5 or radially outward and axially rearward to release the tool. A passage 9 extending axially between the bore 3 and hole 5 allows a hammer rod to act on the back of the tool for drilling in masonry.

The outer edge of each jaw 8 is formed with a row of teeth 10 meshing with an internal screwthread of an annularly continuous tightening ring 11 that is rotatable about the axis 7 but axially nondisplaceable on the chuck body 1 between the parts 2 and 4. An adjustment sleeve 12 that extends the full axial length of the chuck body 1 and that coaxially surrounds it is rotationally connected to the tightening ring 11 so that rotation, normally by hand, of the adjustment sleeve 12 relative to the chuck body 1 moves the jaws 8 in or out, depending on rotation direction.

A locking system 13 is formed by teeth 14 formed on an outer periphery of a snap ring 23 fitted in the chuck body 1 and a leaf-spring locking member 15 that in the unlocked position (FIG. 2) sits in an inwardly open cutout or recess 16 of the sleeve 12 but in a locked position has been cammed by an edge 17 out of this recess 16 and is pressed by the inner surface of the sleeve 12 into engagement between the teeth 14. The leaf spring 15 has a second lobe 38 that can fit in either of two angularly offset pockets 39 of the sleeve 12 to retain the chuck in the locked and unlocked positions. The snap ring 23 is rotationally coupled to the body 1 by three inwardly directed tabs 24 that fit in the jaw passages 7 and have axially forwardly bent portions that act as guides for flat outer surfaces of the jaws 8. This ring 23 bears axially forward via bearing balls 40 on the rear face of the tightening ring 11.

Figure 4:
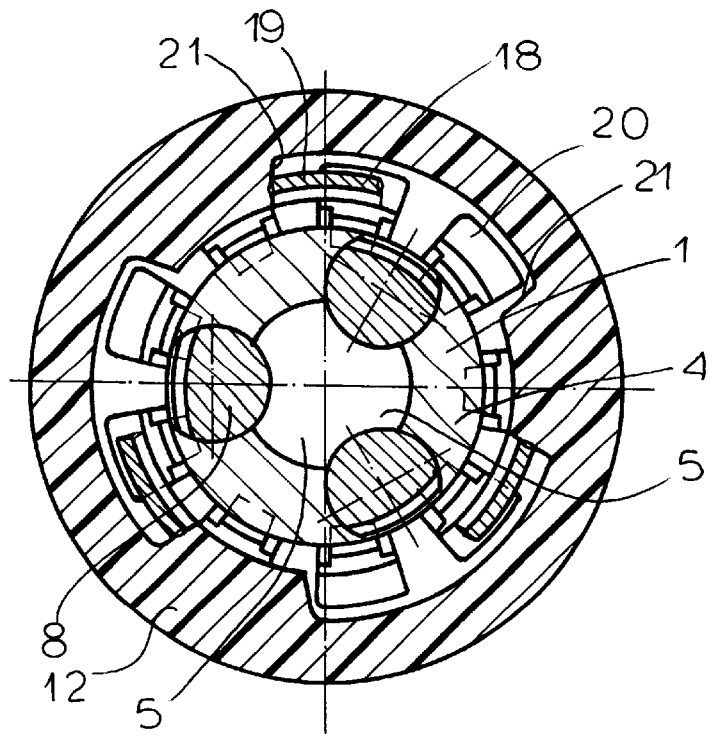
FIGS. 4 and 5 are cross sections taken along lines IV—IV and V—V of FIG. 1.
Figure 5:
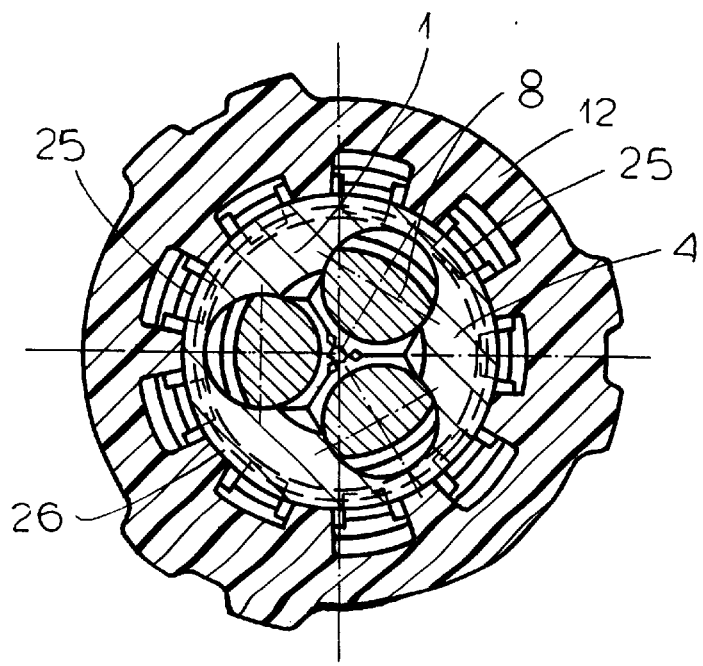

A coupling sleeve 18 provided between the ring 11 and sleeve 12 allows them to move only through a limited angular displacement relative to each other. As shown in FIGS. 1 and 4 this sleeve 18 has forwardly extending arms 19 that engage in radially inwardly open and axially extending slots 20 formed in the adjustment sleeve 12. Side walls 21 of the slots 20 are spaced angularly apart by a distance much greater than the angular width of the arms 19 so these arms 19 can move limitedly angularly in the slots 20, allowing the sleeve 12 to move the recess 16 into and out of alignment with the main part of the locking member 15, thereby locking and unlocking the chuck. The sleeve 18 is formed with a rearwardly directed shoulder 28 that fits tightly around a front outer edge of the tightening ring 11 and thence extends rearward where it is interfitted with the locking member 15

At its front end the sleeve 12 is formed with a cylindrical inwardly directed surface 22 riding on the front part 4 of the chuck body 1 and centering the sleeve 12 on the chuck body 1. Radially deflectable barb tabs 25 formed on the inner end of the sleeve 12 can engage in a radially outwardly open groove 26 of the front part 4 of the chuck body 1 to retain the sleeve 12 in place axially. These barb tabs 25 can deflect outward into radially inwardly open grooves 27 cut into the surface 22.

The rear end of the chuck is formed by a disk 29 having an inner periphery 32 fitted in a groove 30 and sitting on a shoulder 31 at the rear end of the rear part 3. Holes 33 near the inner periphery 32 allow the inner periphery 32 to deflect outward to allow the disk 29 to be snapped in place on the chuck body 1. The outer periphery of the disk 29 rides on the inner surface of the sleeve 12 at its extreme rear end so this sleeve 12 is well supported on the chuck body 1.

Figure 6:
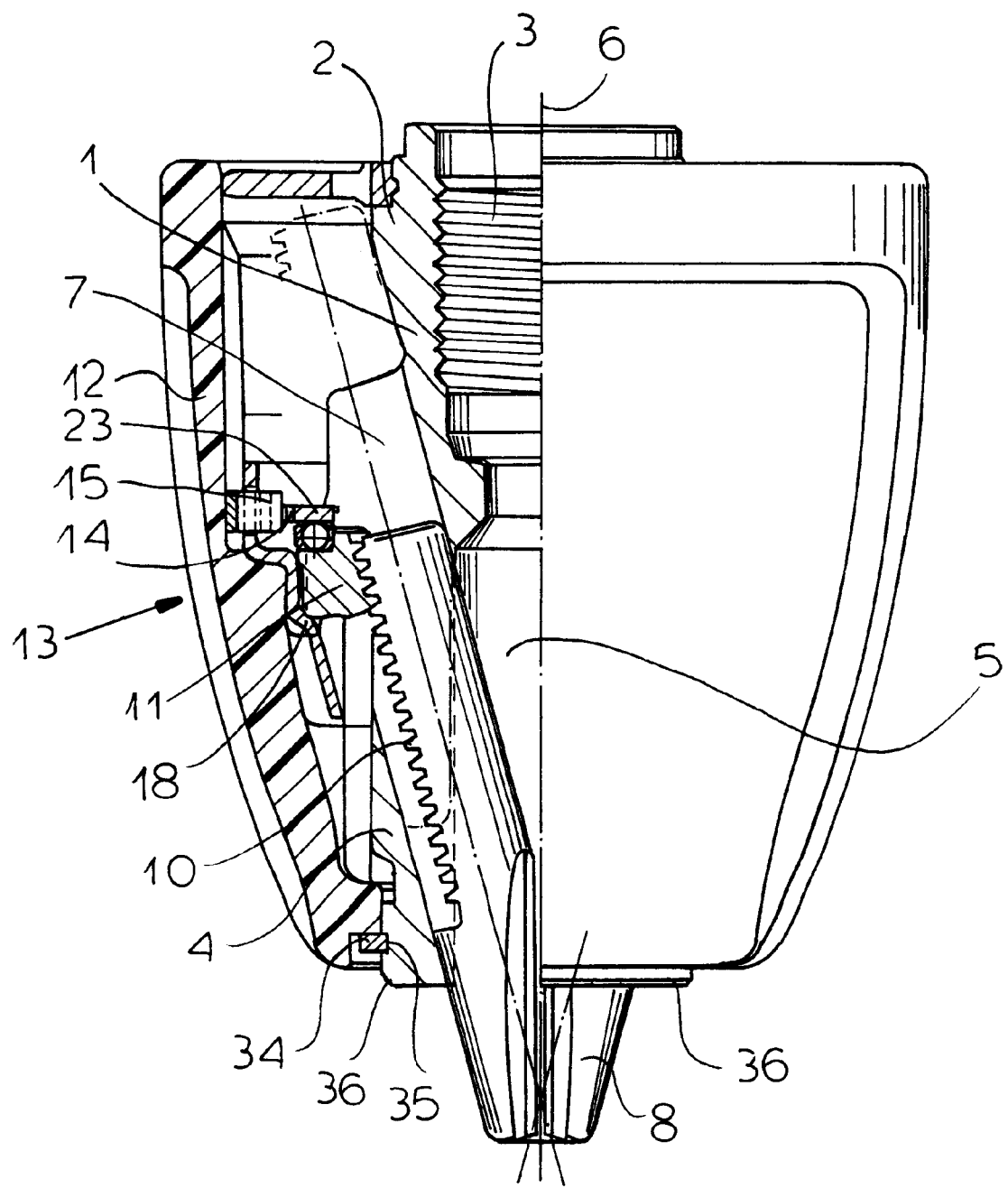
FIGS. 6 and 7 are views like FIG. 1 of alternative chucks in accordance with the invention.

In FIG. 6 instead of the barbs 25 the sleeve 12 is secured axially in place by a snap ring 34 set in a radially outwardly open groove 35 at the front end of the chuck body 1. The extreme front edge of the chuck body 1 is formed with a chamfer or bevel 36 so the snap ring 34, which is split, can be spread to fit over it.

Figure 7:
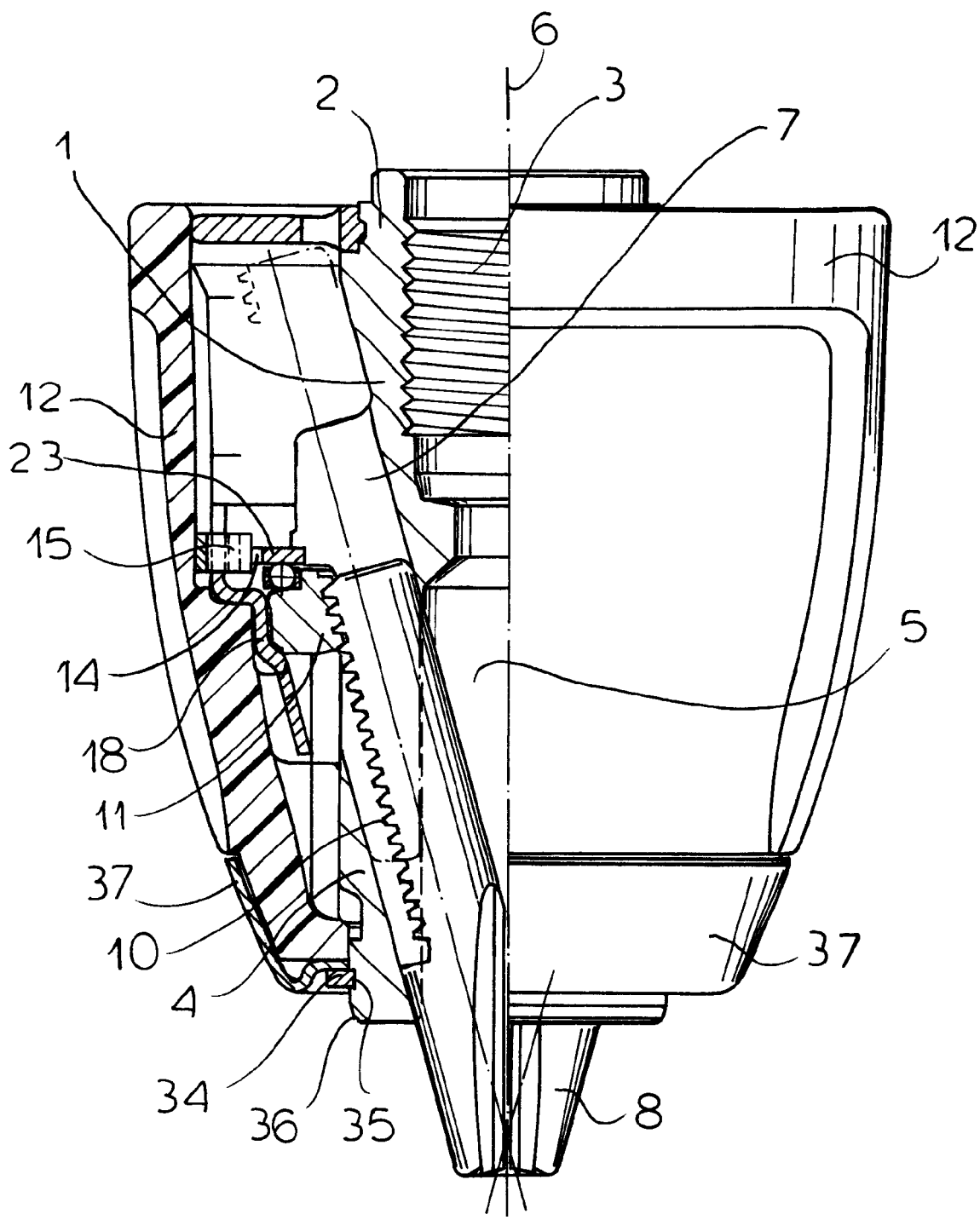

The arrangement of FIG. 7 is identical to that of FIG. 6 except that a sheet-metal shield cup 37 has its inner edge secured between the snap ring 34 and the front end of the sleeve 12. Here the snap ring 34 can be annularly continuous.

The chuck according to the invention is assembled from front to back. The snap ring 23 is set in place and then the jaws 8 and ring 1 are installed. The sleeve 18 with the member 15 is fitted in place, and then the sleeve 12 is fitted over the end and snapped in place to complete the chuck. No tools are needed for any of these assembly operations.

I claim:

1. A drill chuck comprising:
   a body centered on and rotatable about an axis, having a front part and a rear part, and formed with a plurality of angled guides opening axially forward at the front part;
   respective jaws axially and radially displaceable in the guides and each formed with a row of teeth;
   a one-piece and unsplit tightening ring axially fixed but rotatable about the axis on the chuck-body front part, having an inner diameter greater than an outer diameter of the chuck-body front part, and having a screwthread meshing with the teeth, whereby rotation of the tightening ring displaces the jaws in their guides;
   a one-piece and unsplit snap ring set in the chuck-body rear part, bearing axially forward on the tightening ring, formed with an array of outwardly projecting teeth, and having an inner diameter greater than the outer diameter of the chuck-body front part;
   an adjustment sleeve rotatable about the axis on the body and having a front end with a surface bearing directly on the chuck-body front part;
   a coupling sleeve fixed to the tightening ring and engaging the adjustment sleeve;
   formations on the coupling sleeve permitting limited relative angular movement of the adjustment sleeve relative to the tightening ring between a pair of end positions;
   a retaining member securing the adjustment sleeve on the chuck-body front end; and
   a locking element rotationally fixed to the adjustment sleeve and engaging between the teeth in one end position of the adjustment sleeve and disengaged from the teeth in the other end position of the adjustment sleeve.

2. The drill chuck defined in claim 1 wherein each passage has a front end and a rear end and the adjustment sleeve has an inner surface centered on the axis and engaging the chuck-body front part back to the rear passage ends.

3. The drill chuck defined in claim 1 wherein the retaining member is formed by a radially deflectable tab on the adjustment sleeve, the chuck-body front end being formed with a radially outwardly open groove into which the tab can fit.

4. The drill chuck defined in claim 3 wherein the adjustment sleeve is formed with a plurality of such tabs.

5. The drill chuck defined in claim 1 wherein the coupling sleeve is formed with a rearwardly open shoulder into which the tightening ring is fitted.

6. The drill chuck defined in claim 1, further comprising
a disk fixed on the chuck-body rear part rearward of the tightening ring and having an outer periphery engaging and guiding the adjustment sleeve.

7. The drill chuck defined in claim 6, further comprising
snap-interfit formations between the disk and the chuck-body rear part securing the disk on the chuck-body rear part.

8. The drill chuck defined in claim 7 wherein the chuck-body rear part is formed with a rearwardly directed shoulder and immediately thereadjacent a radially outwardly open groove, the snap-interfit formations including a radially inwardly projecting ridge on the disk, the disk sitting on the shoulder and being formed adjacent the ridge with axially throughgoing holes permitting an inner periphery of the disk to deform outward for fitting of the ridge to the groove.

9. The drill chuck defined in claim 1 wherein the snap ring is formed with radially inwardly projecting tabs received in the passages.

10. The drill chuck defined in claim 9 wherein the tabs project axially forward and guidingly engage the respective jaws.

11. The drill chuck defined in claim 1 wherein the retaining member in a second snap ring set in the chuck-body front part.

12. The drill chuck defined in claim 11 wherein the second snap ring is split and of metal.

13. The drill chuck defined in claim 11 wherein the chuck-body front part has an extreme front end formed with chamfered edge facilitating installation of the second snap ring.

14. The drill chuck defined in claim 11 wherein the adjustment member is provided with an axially forwardly directed end shield cap.

15. The drill chuck defined in claim 14 wherein the end shield cap has an inner periphery engaged between the second snap ring and the adjustment sleeve.

\* \* \* \* \*